United States Patent [19]

Toyota et al.

[11] 4,087,479
[45] May 2, 1978

[54] HEAT-CURABLE RESIN COMPOSITIONS FOR POWDER PAINTS

[75] Inventors: Yoshiho Toyota; Singo Sasaki; Katsuyoshi Atsumi; Akio Nakagi, all of Okazaki, Japan

[73] Assignee: Nippon Ester Co., Ltd., Okazaki, Japan

[21] Appl. No.: 718,275

[22] Filed: Aug. 27, 1976

[30] Foreign Application Priority Data

Aug. 27, 1975 Japan .................................. 50-103838

[51] Int. Cl.$^2$ ............................................. C08L 63/00
[52] U.S. Cl. ..................................... 260/835; 428/413
[58] Field of Search ......................................... 260/835

[56] References Cited

U.S. PATENT DOCUMENTS

| 3,880,946 | 4/1975 | LaBana et al. | 260/835 |
| 3,954,901 | 5/1976 | Watanabe et al. | 260/835 |

*Primary Examiner*—Harry Wong, Jr.
*Attorney, Agent, or Firm*—Sughrue, Rothwell, Mion, Zinn and Macpeak

[57] ABSTRACT

A heat-curable resin composition obtained by mixing (A) a polyester resulting from the depolymerization of a polyester of a high degree of polymerization comprising an aromatic dicarboxylic acid and an aliphatic dialcohol using a compound containing about 2 to about 12 carboxyl groups per molecule with (B) a polyoxirane compound containing about 2 to about 100 oxirane groups per molecule. A heat-curable resin composition obtained by adding to the above resin composition a salt formed between an aliphatic monocarboxylic acid containing 2 to 20 carbon atoms and an element of Group II of the Periodic Table as a curing accelerator is an especially superior material for powder paints. Powder paints prepared from these heat-curable resin compositions provide coatings having superior appearance and properties upon baking after coating by a method such as an electrostatic spray coating method or a fluidized dip coating method.

22 Claims, No Drawings

HEAT-CURABLE RESIN COMPOSITIONS FOR POWDER PAINTS

BACKGROUND OF THE INVENTION

1. Field of the Invention

This invention relates to novel heat-curable resin compositions suitable for the preparation of powder paints.

2. Description of the Prior Art

Powder paints have attracted attention as pollution-free paints, and have recently come into increasing acceptance because of their various advantages. For example, high coating yields can be obtained because the paints can be recovered and reused, and in one coating operation a coating having a desired coating thickness ranging from about 30 microns to about 500 microns can be obtained.

Various thermoplastic resins and thermosetting resins have been considered as materials for powder paints. Of these, heat-curable polyester resins and heat-curable polyester-type resin compositions are widely expected to be suitable as materials for powder paints that provide cured coatings having superior weatherability, mechanical strength, and chemical properties.

It has been known heretofore that heat-curable resin compositions consisting of polyesters containing carboxyl groups and polyoxirane compounds can be used as materials for powder paints. For instance, British Pat. No. 1,381,262 discloses that a heat-curable resin composition composed of a mixture of (1) a solid modified polyester obtained by reacting a polyester having a hydroxyl number of 15 to 50 (obtained from an acid component and an alcohol component by a conventional polyester-forming reaction) with an anhydride of a polybasic organic carboxylic acid and (2) an epoxy resin containing at least 2 epoxy groups on the average per molecule can be used as a material for powder paints. However, with the disclosed method, a heat-curable resin composition having the various properties required of a material for powder paint is difficult to obtain on a commercial scale in a reproducible, stable manner.

Generally, the degree of polymerization of polyesters prepared by a polyester-forming reaction or a polycondensation reaction is controlled by, for example, the following methods.

(1) A method wherein the end point of the reaction is determined by measuring the melt viscosity of the polyester, that is, the torque or power required to stir the same.

(2) A method wherein the end point of the reaction is determined by measuring the carboxyl content or hydroxyl content of the polyester collected from the reactor.

(3) A method wherein the end point of the reaction is determined by the amount of the alcohol or water removed from the reaction system.

(4) A method wherein the end point of the reaction is determined by maintaining the reaction conditions constant.

However, it is difficult by these methods to produce a polyester having a relatively low average degree of polymerization of about 3 to about 50 in a reproducible, stable manner on a commercial scale which is suitable for the preparation of a heat-curable resin composition for powder paint.

Moreover, in the addition reaction between a hydroxyl-containing polyester and a polybasic organic carboxylic acid anhydride carried out at a temperature of about 180° C to about 250° C, esterification simultaneously proceeds. Hence, the average degree of polymerization and the carboxyl group content of the polyester are difficult to adjust to constant values.

On the other hand, U.S. Pat. No. 3,954,901 discloses that a polyester having a high degree of polymerization can be depolymerized using a substantially non-volatile alcohol and/or an ester containing at least one alcoholic hydroxyl group per molecule to produce a polyester resin having a low degree of polymerization suitable for the preparation of heat-curable resin compositions for powder paints.

SUMMARY OF THE INVENTION

It is one object of this invention to provide a heat-curable resin composition which is extremely suitable as a material for powder paints and can be produced in a reproducible, stable manner on a commercial scale.

We performed extensive research in order to prepare a heat-curable resin composition comprising a carboxyl-containing polyester and a polyoxirane compound which meets all of the requirements of a material for a powder paint and can be produced stably on a commercial scale. These investigations led to the discovery that by depolymerizing a polyester having a high degree of polymerization and a small hydroxyl content, for example, a hydroxyl group content of about 20 gram equivalents/$10^6$ g to about 200 gram equivalents/$10^6$ g, using a compound containing about 2 to about 12 carboxyl groups per molecule, the average degree of polymerization and the carboxyl content of the polyester can be controlled in a reproducible and stable manner; a heat-curable resin composition obtained by mixing the resulting carboxyl-containing polyester with a specified polyoxirane compound in a specified ratio is especially suitable as a material for a powder paint; and that coatings of a heat-curable resin composition obtained by adding to the above heat-curable resin composition a salt formed between an aliphatic monocarboxylic acid containing 2 to 20 carbon atoms and an element of Group II of the Periodic Table as a curing accelerator can be baked at low temperatures within short periods of time without impairing their appearance and other properties. Based on these discoveries, the present invention was reached.

According to the invention, there are provided a heat-curable resin composition having a softening point of about 40° C to about 150° C for a powder paint which is obtained by mixing: (A) a polyester having an average degree of polymerization of about 3 to about 50, a softening point of about 40° C to about 150° C, and a carboxyl group content of about 250 gram equivalents/$10^6$ g to about 3,500 gram equivalents/$10^6$ g obtained by depolymerizing a polyester comprising an aromatic dicarboxylic acid and an aliphatic dialcohol and having a high degree of polymerization represented by an intrinsic viscosity, measured in a mixed solvent of phenol and tetrachloroethane (1 : 1 by weight) at 20° C, of about 0.4 to about 2.0 using a compound containing about 2 to about 12 carboxyl groups per molecule, at a temperature of about 180° C to about 300° C, with (B) a polyoxirane compound containing about 2 to about 100 oxirane groups per molecule and having an oxirane group content of about 300 gram equivalents/$10^6$ g to about 9,600 gram equivalents/$10^6$ g and a melting point of not more than about 150° C (preferably, a melting point of from about −50° C to about 0° C) in amounts which satisfy the following equation:

$$0.5 \leq O/C \leq 2.0$$

wherein O represents the oxirane group content of the polyoxirane compound, and C represents the carboxyl group content of the polyester; and also a heat-curable resin composition for a powder paint obtained by adding about 0.1 part by weight to about 5 parts by weight of one or more salts formed between an aliphatic monocarboxylic acid containing 2 to 20 carbon atoms and an element of Group II of the Periodic Table to 100 parts of the heat-curable resin composition described above.

These heat-curable resin compositions have superior suitability for the preparation of a powder paint, and the powder paint prepared therefrom has superior anti-blocking property. By coating the resulting powder paint in accordance with an electrostatic spray coating method, a fluidized dip coating method, etc., and baking the coating, there can be obtained a cured coatings having superior appearance, and superior properties such as mechanical strength, weatherability, moisture resistance, salt water resistance and organic solvent resistance.

DETAILED DESCRIPTION OF THE INVENTION

The polyester having an average degree of polymerization of about 3 to about 50, a softening point of about 40° C to about 150° C and a carboxyl group content of about 250 gram equivalents/$10^6$ g to about 3,500 gram equivalents/$10^6$ g used as component (A) of the heat-curable resin composition of this invention is obtained by depolymerizing a polyester having a high degree of polymerization with an intrinsic viscosity, measured in a mixed solvent of phenol and tetrachloroethane (1 : 1 by weight) at 20° C, of about 0.4 to about 2.0, preferably 0.6 to 1.3, for example, a hydroxyl group content of about 20 gram equivalents/$10^6$ g to about 200 gram equivalents/$10^6$ g, using a compound containing about 2 to about 12 carboxyl groups per molecule.

Examples of the aromatic dicarboxylic acid component used in the synthesis of the polyester having an intrinsic viscosity of about 0.4 to about 2.0 are terephthalic acid, isophthalic acid, phthalic acid, and 2,6-naphthalenedicarboxylic acid, and ester-forming derivatives of these aromatic dicarboxylic acids, such as lower alkyl esters thereof (containing 1 to 4 carbon atoms in the alkyl moiety) (e.g., methyl esters, and ethyl esters).

Examples of the aliphatic dialcohol are ethylene glycol, 1,2-propanediol, 1,3-propanediol, 1,4-butanediol, 1,5-pentanediol, 1,6-hexanediol, diethylene glycol, triethylene glycol, and neopentyl glycol.

Furthermore, a saturated aliphatic dicarboxylic acid, preferably a saturated aliphatic dicarboxylic acid containing 2 to 12 carbon atoms, such as succinic acid, adipic acid, azelaic acid, suberic acid, sebacic acid or dodecanedicarboxylic acid, a hydroxycarboxylic acid, preferably an aromatic hydroxycarboxylic acid such as p-hydroxybenzoic acid or vanilic acid, and ester-forming derivatives of these acids such as a lower alkyl ester thereof containing 1 to 4 carbon atoms in the alkyl moiety thereof, e.g., methyl esters and ethyl esters, can also be used in amounts of up to about 50 mol%, preferably only up to 30 mol%, based on the entire acid component of the polyester. Likewise, an alicyclic dialcohol such as 1,4-cyclohexanedimethanol, 2,2-bis(4-hydroxycyclohexyl)propane or 2,2-bis(4-hydroxycyclohexyl)methane, and an aromatic dialcohol such as 1,4-xylylene glycol, o-phthalyl alcohol or m-phthalyl alcohol can also be used in amounts of up to about 50 mol%, preferably only up to 30 mol%, based on the entire alcohol component of the polyester.

The compounds containing about 2 to about 12 carboxyl groups per molecule used for depolymerizing the polyester having an intrinsic viscosity of about 0.4 to about 2.0 include, for example, dicarboxylic acids such as terephthalic acid, isophthalic acid, phthalic acid, 2,6-naphthalenedicarboxylic acid, succinic acid, adipic acid, azelaic acid, suberic acid, sebacic acid, or dodecanedicarboxylic acid, polycarboxylic acids containing 3 or 4 carboxyl groups such as trimellitic acid, trimesic acid, or pyromellitic acid, and compounds containing about 2 to about 12 carboxyl groups per molecule which are obtained by reacting these polycarboxylic acids or polycarboxylic acid anhydrides with polyols such as ethylene glycol, 1,2-propanediol, 1,3-propanediol, 1,4-butanediol, 1,5-pentanediol, 1,6-hexanediol, diethylene glycol, triethylene glycol, neopentyl glycol, 1,4-cyclohexanedimethanol, 2,2-bis(4-hydroxycyclohexyl)-methane, 2,2-bis(4-hydroxycyclohexyl)-propane, 1,4-xylylene glycol, o-phthalyl alcohol, m-phthalyl alcohol, glycerin, trimethylol ethane, trimethylol propane, or pentaerythritol. Of these, terephthalic acid, isophthalic acid, phthalic acid, 2,6-naphthalenedicarboxylic acid, succinic acid, adipic acid, azelaic acid, suberic acid, sebacic acid, dodecanedicarboxylic acid, trimellitic acid, trimesic acid, and pyromellitic acid are especially preferred.

The polyester used as component (A) of the heat-curable resin composition of this invention having an average degree of polymerization of about 3 to about 50, a softening point of about 40° C to about 150° C, and a carboxyl group content of about 250 gram equivalents/$10^6$ g to about 3,500 gram equivalents/$10^6$ g can be prepared, for example, by the following method.

(1) The dicarboxylic acid mainly consisting of the aromatic dicarboxylic acid or its ester-forming derivative and the dialcohol mainly consisting of the aliphatic dialcohol are subjected to an esterification reaction, or, if desired, subjected to an ester-interchange reaction by the method disclosed in U.S. Pat. No. 3,142,733 in the presence of an ordinary ester-interchange reaction catalyst such as zinc acetate, lead acetate, manganese acetate, zinc tungstate, lead tungstate, zinc carbonate, lead carbonate, or manganese carbonate, and successively subjected to a polycondensation reaction at a reduced pressure of not more than about 1 mmHg in the presence of a conventional polycondensation reaction catalyst such as antimony trioxide, antimony acetate or germanium oxide in accordance with the method disclosed in U.S. Pat. No. 3,142,733 to prepare a polyester having a high degree of polymerization with an intrinsic viscosity, measured in a mixed solvent of phenol and tetrachloroethane (1 : 1 by weight) at 20° C, of about 0.4 to about 2.0.

(2) The polyester having a high degree of polymerization so prepared is then depolymerized, e.g., by the method disclosed in Japanese Patent Application (OPI)87023/1975, with a compound containing about 2 to about 12 carboxyl groups per molecule in an atmosphere of nitrogen at a temperature of about 180° C to about 300° C, preferably 200° C to 280° C, for about 1 hour to about 10 hours, preferably 1 hour to 3 hours, to form a polyester having an average degree of polymerization of about 3 to about 50, and a carboxyl group content of about 250 gram equivalents/$10^6$ g to about 3,500 gram equivalents/$10^6$ g.

In order to control the average degree of polymerization of the polyester, the amount of the compound containing about 2 to about 12 carboxyl groups per molecule used for depolymerization is determined by the following equation according to the average degree of polymerization of the intended polyester.

$$\overline{Pn} = \frac{b_1 + b_2}{(a_1 + a_2) - (b_1 + b_2)}$$

wherein $\overline{Pn}$ is the average degree of polymerization of the intended final polyester, $a_1$ represents the amount in mols of the acid component of the polyester having a high degree of polymerization, $b_1$ represents the amount in mols of the alcohol component of the polyester having a high degree of polymerization, $a_2$ represents the amount in mols of the acid component of the compound containing about 2 to about 12 carboxyl groups per molecule used in depolymerization, and $b_2$ represents the amount in mols of the alcohol component of the compound containing about 2 to about 12 carboxyl groups per molecule used in the depolymerization.

The average degree of polymerization of the polyester resin greatly affects the properties of the heat-curable resin composition, especially its pulverizability and anti-blocking property. That is, when the average degree of polymerization of the polyester resin is less than about 3, blocking occurs, and the resin composition is difficult to store stably in the form of a fine powder. On the other hand, when the average degree of polymerization of the polyester exceeds about 50, it is difficult to pulverize the resin composition to a fine powder. In order to prepare a resin composition having superior pulverizability and anti-blocking property, it is necessary to adjust the average degree of polymerization of a polyester to about 3 to about 50, preferably 5 to 50, more preferably 5 to 30.

A powder paint is stable at room temperature in the form of a fine powder, and it is usually coated on a metal substrate, and then baked to thereby form a cured coating. Naturally, therefore, the softening point of the heat-curable resin composition should be adjusted to at least room temperature but not more than the baking temperature, that is, about 40° C to about 150° C, preferably 60° C to 120° C.

Therefore, the softening point of the polyester, which has a great influence on that of the heat-curable resin composition, should be controlled to be about 40° to about 150° C, preferably 60° to 120° C.

Moreover, the carboxyl group content of the polyester markedly affects the properties of coatings obtained by coating and baking the heat-curable resin composition. When the carboxyl content of the polyester is less than about 250 gram equivalents/$10^6$ g, cross-linking at the time of curing is insufficient, and a cured coating having sufficient properties cannot be obtained. Furthermore, when the carboxyl group content exceeds about 3,500 gram equivalents/$10^6$ g, the heat-flowability of a coating formed therefrom at the time of curing is poor, and coatings having sufficient smoothness cannot be obtained, and the flexibility of a coating formed therefrom is insufficient. Accordingly, the carboxyl group content of the polyester should be adjusted to about 250 gram equivalents/$10^6$ g to about 3,500 gram equivalents/$10^6$ g, preferably 300 gram equivalents/$10^6$ g to 2,500 gram equivalents/$10^6$ g.

Especially preferred species of the polyoxirane compound containing about 2 to about 100 oxirane groups per molecule and having an oxirane group content of about 300 gram equivalents/$10^6$ g to about 9,600 gram equivalents/$10^6$ g and a melting point of not more than about 150° C are an epoxy resin of the following structural formula resulting from the reaction of epichlorohydrin with bisphenol A[2,2-bis(4-hydroxyphenyl)-propane]

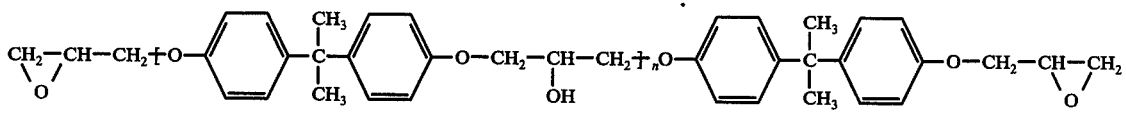

(n ÷ 0 - 20) , an epoxy resin of the following structural formula resulting from the reaction of epichlorohydrin and hydrogenated bisphenol A[2,2-bis(4-hydroxycyclohexyl)propane]

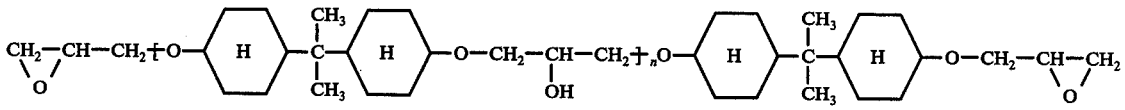

(n ÷ 0 - 20) , an epoxy resin having the following structural formula resulting from the reaction of epichlorohydrin with p-hydroxybenzoic acid

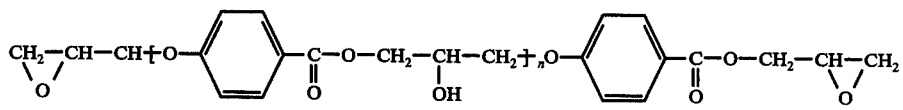

(n = 0 - 30) , an epoxy resin of the following structural formula resulting from the reaction of epichlorohydrin and 5,5-dimethyl hydantoin

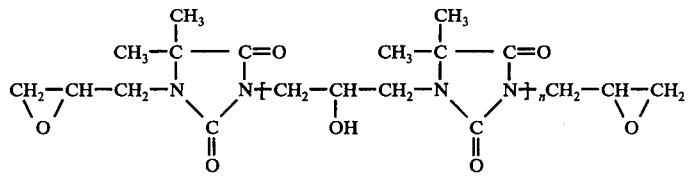

(n ÷ 0 - 30), and epoxy resins of the following structural formula resulting from the reaction of epichlorohydrin and isocyanurate

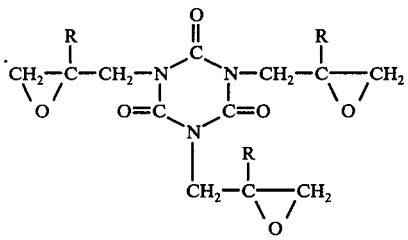

wherein R represents a hydrogen atom or a methyl group.

There can also be used diglycidyl phthalate, diglycidyl isophthalate, diglycidyl terephthalate, triglycidyl trimellitate, diglycidyl adipate, and diglycidyl hexahydrophthalate, or glycidyl ester-type epoxy resins which are condensates of the above.

Acrylic resins containing about 2 to about 100 oxirane groups per molecule can also be used as component (B) of the heat-curable resin composition of this invention. These acrylic resins include, for example, acrylic resins containing about 2 to about 100 oxirane groups per molecule and having an oxirane group content of about 300 gram equivalents/$10^6$ g to about 9,600 gram equivalents/$10^6$ g and a softening point of about 40° C to about 150° C which are obtained by copolymerizing, e.g., according to the method described in U.S. Patent Application Ser. No. 172,236, filed Aug. 16, 1971 now U.S. Pat. No. 3,752,870, corresponding to Japanese Patent Application (OPI) 29836/1973, an oxirane-containing monomer (about 5 to about 40 mol%, preferably 15 to 35 mol%) of the following general formula:

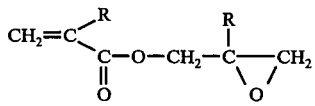

wherein R represents a hydrogen atom or a methyl group, such as glycidyl acrylate, glycidyl methacrylate, β-methylglycidyl acrylate or β-methylglycidyl methacrylate, with a monomer copolymerizable therewith, such as methyl acrylate, ethyl acrylate, butyl acrylate, methyl methacrylate, ethyl methacrylate, butyl methacrylate, styrene, vinyltoluene, acrylonitrile or methacrylonitrile.

In the case that the amount of the above described oxirane containing monomer is below about 5 mol%, the cured coating obtained has a poor degree of cross-linking, with the result that its weatherability and adhesiveness to metals are considerably decreased. In the case it is above about 40 mol%, the cured coating obtained has poor smoothness and luster. Therefore, the amount of the oxirane containing monomer to be copolymerized therewith should be about 5 to about 40 mol%, more preferably 15 to 35 mol%.

The heat-curable resin composition having a softening point of about 40° to about 150° C of this invention is prepared, for example, by the following method from the polyester having an average degree of polymerization about 3 to about 50, a softening point of about 40° C to about 150° C, and a carboxyl group content of about 250 gram equivalents/$10^6$ g to about 3,500 gram equivalents/$10^6$ g and the polyoxirane compound containing about 2 to about 100 oxirane groups per molecule and having an oxirane group content of about 300 gram equivalents/$10^6$ g to about 9,600 gram equivalents/$10^6$ g and a melting point of not more than about 150° C. For example, the polyester and the polyoxirane compound are mixed by means of a kneader at a temperature of about 70° C to about 150° C, preferably 100° C to 120° C, in amounts which meet the following equation:

$$0.5 \leq O/C \leq 2.0$$

wherein O represents the oxirane group content of the polyoxirane compound, and C represents the carboxyl group content of the polyester.

If the mixing ratio (O/C) between the polyester and the polyoxirane compound is less than 0.5, a number of free carboxyl groups remain in the cured coatings to deteriorate the properties of the cured coatings. Furthermore, since the cross-linking density is insufficient, the resulting coatings do not possess a sufficient coating strength. On the other hand, when the ratio (O/C) is higher than 2.0, a number of free oxirane groups remain in the cured coatings to deteriorate the properties of the cured coatings. Furthermore, since the cross-linking density is insufficient, cured coatings having sufficient strength cannot be obtained. Accordingly, the polyester and the polyoxirane compound should be mixed in amounts which satisfy the above equation.

Preferably, the polyester and the polyoxirane compound are merely in the mixed state. But there may be a partial reaction between them if it does not adversely affect the heat flowability of the mixture.

A powder paint prepared from a heat-curable resin composition so obtained provides a coating having superior appearance and properties by coating in accordance with an electrostatic spray coating method (Japanese Patent Publication 25663/1968) or a fluidized dip coating method (Japanese Patent Publication 10759/1967) and then baking the coating.

The curability of a powder paint prepared from a heat-curable resin composition comprising a carboxyl-terminated polyester and a polyoxirane compound at the time of baking is generally greatly dependent on the reactivity of the polyoxirane compound, and, generally, relatively high baking temperatures of about 190° C to about 230° C are required, except where highly reactive polyoxirane compounds such as triglycidyl isocyanurate are used.

For certain applications, powder paints should have low temperature curability or rapid curability, and in order to impart low temperature curability or rapid curability to the heat-curable resin composition, a curing accelerator may be added thereto.

In view of the above, we have extensively studied curing accelerators in order to impart low temperature curability or rapid curability to the heat-curable resin composition, and we found that by using a salt formed between an aliphatic monocarboxylic acid containing 2 to 20 carbon atoms and an element of Group II of the Periodic Table as a curing accelerator, low temperature curability or rapid curability can be imparted to the resin composition without impairing the appearance and properties of cured coatings prepared from the resin composition.

Examples of such salts include magnesium stearate, calcium stearate, zinc stearate, barium stearate, cadmium stearate, magnesium palmitate, calcium palmitate, zinc palmitate, magnesium myristate, calcium myristate, zinc myristate, magnesium laurate, calcium laurate, zinc laurate, magnesium caprylate, calcium caprylate, and zinc caprylate. Magnesium, calcium, zinc, barium, and cadmium salts of mixed aliphatic monocarboxylic acids containing at least two aliphatic monocarboxylic acids, such as coconut acid, can also be used.

The curing accelerator used in this invention can be added to the heat-curable resin composition in an amount of about 0.1 part by weight to about 5 parts by weight, preferably 0.2 part by weight to 3 parts by weight, based on 100 parts by weight of the latter. If the amount of the curing accelerator is less than about 0.1 part by weight per 100 parts by weight of a heat-curable resin composition, it is impossible to render the heat-curable resin composition sufficiently curable within short periods of time at low temperatures. If it exceeds about 5 parts by weight, the heat-flowability of a resin composition at the time of curing is reduced, and a cured coating having sufficient smoothness cannot be obtained.

A curing accelerator may be added during the preparation of a mixture of the polyester and the polyoxirane compound, or to the polyester or polyoxirane compound prior to mixing.

A powder paint can be prepared from a heat-curable resin composition of this invention by, for example, a method which comprises mixing a pigment, a filler, and a levelling agent, etc., with a heat-curable resin composition using a kneader at a temperature of about 70° C to about 150° C, preferably 90° C to 120° C, cooling and solidifying the mixture, and then finely pulverizing the mixture using a pulverizer (such as a pin disc mill) to form a powder paint. If desired, a pigment, a filler and a levelling agent (often called a flow control agent) may be added at the time of preparing a heat-curable resin composition by mixing the polyester resin and a polyoxirane compound, and, if desired, also a curing accelerator.

A powder paint so prepared is coated on a substrate by, for example, an electrostatic spray coating method, or a fluidized dip coating method, and then baked at a temperature of about 150° C to about 230° C to form a cured coatings.

The following Examples specifically illustrate the present invention, without limiting the same. Unless otherwise indicated, in the following all processings were at atmospheric pressure and all parts are by weight.

In the specification and the following Examples and Comparative Examples, the softening points of resins are determined by the ring-and-ball method (JIS K-5902), and the average degree of polymerization of the resins is calculated from the number average molecular weights of the resins measured by an osmotic pressure method.

Preparation of Polyester (1) Preparation of a polyester having a high degree of polymerization:

An acid component selected from dimethyl terephthalate, dimethyl isophthalate, and methyl p-hydroxyethoxybenzoate and an alcohol component selected from ethylene glycol, neopentyl glycol and 1,4-butanediol in the amounts shown in Table 1 were subjected to an ester-interchange reaction in the presence of 0.01 mol of zinc acetate as a catalyst at a temperature of 150° C to 240° C and at atmospheric pressure for 5 hours while distilling off methanol. When necessary, after the ester-interchange reaction, adipic acid or sebacic acid was added in the amounts shown in Table 1, and an esterification was performed at a temperature of 240° C and at atmospheric pressure for 2 hours while distilling off water.

Subsequently, 0.02 mol of antimony trioxide as a catalyst and 0.02 mol of triphenyl phosphite as an additive were added. The reaction temperature was raised to 270° C, and the inside of the reaction system was gradually reduced in pressure. Finally at a reduced pressure of 0.05 mmHg, a polycondensation reaction was performed for 4 to 6 hours while distilling off the alcohol component. There were thus prepared polyesters having a high degree of polymerization as represented by their intrinsic viscosities, measured in a mixed solvent of phenol and tetrachloroethane (weight ratio of 1 : 1) at 20° C, and a hydroxyl group content as shown in Table 1.

TABLE 1

| | Mols of the starting components and properties of polyesters having a high degree of polymerization | | | | | | | | | |
|---|---|---|---|---|---|---|---|---|---|---|
| | Polyester No. | | | | | | | | | |
| Starting components | A | B | C | D | E | F | G | H | I | J |
| Acid component | | | | | | | | | | |
| Dimethyl terephthalate | 100 | 100 | 70 | 80 | 90 | 60 | 80 | 70 | 90 | 80 |
| Dimethyl isophthalate | — | — | 30 | 20 | 10 | — | — | — | — | — |
| Methyl p-hydroxyethoxybenzoate | — | — | — | — | — | 40 | 10 | — | — | — |
| Adipic acid | — | — | — | — | — | — | — | 30 | 10 | — |

TABLE 1-continued

Mols of the starting components and properties of polyesters having a high degree of polymerization

| Starting components | Polyester No. | | | | | | | | | |
|---|---|---|---|---|---|---|---|---|---|---|
| | A | B | C | D | E | F | G | H | I | J |
| Sebacic acid | — | — | — | — | — | — | 10 | — | — | 20 |
| Alcohol component | | | | | | | | | | |
| Ethylene glycol | 120 | 100 | 180 | 140 | 100 | 140 | 180 | 100 | 100 | 100 |
| Neopentyl glycol | 60 | 100 | — | 40 | — | 40 | — | 100 | 60 | — |
| 1,4-Butanediol | — | — | — | — | 60 | — | — | — | — | 80 |
| Properties | | | | | | | | | | |
| Intrinsic viscosity | 0.68 | 0.68 | 0.68 | 0.67 | 0.69 | 0.67 | 0.65 | 0.68 | 0.67 | 0.69 |
| Hydroxyl groups content (g · eq/$10^6$ g) | 68 | 57 | 63 | 54 | 36 | 45 | 96 | 63 | 72 | 31 |

(2) Preparation of polyester

Each of the polyesters having a high degree of polymerization prepared as above was depolymerized at 230° C for 3 hours and at atmospheric pressure using a carboxyl-containing compound selected from isophthalic acid, adipic acid, trimellitic acid, ethylene glycol ditrimellitate and trimethylol propane trisuccinate as a depolymerization component in the amounts shown in Table 2. Thus, polyesters having the properties shown in Table 3 were prepared.

TABLE 2

Mols of the depolymerization components

| Depolymerization components | Polyester No. | | | | | | | | | |
|---|---|---|---|---|---|---|---|---|---|---|
| | A | B | C | D | E | F | G | H | I | J |
| Isophthalic acid | — | — | 10 | — | — | — | 2 | — | 20 | — |
| Adipic acid | — | — | — | — | 5 | — | — | — | — | 10 |
| Trimellitic acid | 20 | 5 | — | 10 | — | — | — | 4 | — | — |
| Ethylene glycol ditrimellitate | — | — | — | — | 5 | — | 1 | — | — | — |
| Trimethylolpropane trisuccinate | — | — | — | — | — | 4 | — | — | 5 | — |

TABLE 3

| Properties | Polyester No. | | | | | | | | | |
|---|---|---|---|---|---|---|---|---|---|---|
| | A | B | C | D | E | F | G | H | I | J |
| Properties | | | | | | | | | | |
| Average degree of polymerization | 5.1 | 20.6 | 10.2 | 10.3 | 10.5 | 13.2 | 25.4 | 24.8 | 5.3 | 9.8 |
| Carboxyl group content (g · equivalents/$10^6$ g) | 2357 | 647 | 919 | 1325 | 1304 | 854 | 561 | 536 | 2096 | 934 |
| Hydroxyl group content (g · equivalents/$10^6$ g) | 24 | 22 | 31 | 16 | 12 | 22 | 14 | 22 | 14 | 31 |
| Softening point (° C) | 76 | 91 | 73 | 78 | 83 | 78 | 87 | 78 | 68 | 63 |

EXAMPLE 1

Polyester A (carboxyl group content: 2357 g·eq/$10^6$ g (acid number: 132)), triglycidyl isocyanurate (oxirane group content: 9520 g·eq/$10^6$ g (epoxy equivalent: 105), melting point: 105° C), rutile-type titanium oxide as a pigment and Silicone Oil YF-3860 (a product of Toshiba Silicone Co., Ltd.) as a levelling agent were blended in the amounts shown in Table 4.

TABLE 4

| | |
|---|---|
| Polyester resin A | 853 g |
| Triglycidyl isocyanurate | 147 g |
| Rutile-type titanium dioxide (particle size of about 0.1 to about 0.4 μ) | 500 g |
| Silicone Oil YF-3860 | 20 g |

In this blend, the ratio of the oxirane group content of the triglycidyl isocyanurate to the carboxyl group content of the polyester A was 0.7/1.0.

These ingredients were pre-mixed using a Henschel mixer (Type FM 10 B, a product of Mitsui Miike Seisakusho Co., Ltd.), and subsequently, melt-mixed using a co-kneader, PR 46 type (a product of Buss AG). The resin composition obtained was finely pulverized using a microsample mill (a product of Hosokawa Tekkosho Co., Ltd.). The fine particles obtained were passed through a 150-mesh sieve to form a powder paint.

The powder paint was coated on a zinc phosphate-treated steel panel of a size of 70 mm × 150 mm × 1 mm using an electrostatic spray coater, 720 Type (a product of Gema AG), and baked in an oven at 170° C for 30 minutes to form a cured coating having a thickness of about 60 microns.

The properties of the coating so obtained are shown in Table 5.

TABLE 5

| | |
|---|---|
| Gloss | 98% |
| Impact strength test | $\frac{1}{2}$" - 500 g - 45 cm |
| Bending test | good |
| Erichsen test | > 9 mm |
| Boiling water resistance test | no peeling |
| Salt spray test | < 1 mm |
| Acetone resistance test | good |
| Weatherability test | 90% |

The tests shown in Table 5 were performed as follows:

| | |
|---|---|
| Gloss: | Ratio of reflection on a mirror surface at 60° in accordance with JIS Z-8741 |
| Impact resistance test: | Du Pont impact strength test |
| Bending test: | In accordance with JIS K-5400 (3 mm diameter) |
| Erichsen test: | In accordance with JIS Z-2247 |

| | -continued |
|---|---|
| Boiling water resistance test: | A boiling water treatment was performed in accordance with JIS K-6902, and then a crosscut test was performed at intervals of 1 mm both lengthwise and crosswise. Then, the state of peeling was observed. |
| Salt spray test: | A coated steel panel provided with an incision was dipped in a 5% saline solution for 20 days, and the width of the resulting rust was measured. |
| Acetone resistance test: | In accordance with JIS K-6911 |
| Weatherability test: | Gloss (ratio of reflection on a mirror surface at 60°) retention after one year outdoor exposure |

The softening point of the heat-curable resin composition was 70° C.

When the above powder paint was allowed to stand for 7 days at a temperature of 40° C, no blocking occurred.

EXAMPLES 2 TO 9

Powder paints were prepared in the same way as in Example 1 except that the polyester and polyoxirane compounds shown in Table 6 were used instead of polyester A and the triglycidyl isocyanurate. When these powder paints were allowed to stand for 7 days at a temperature of 40° C, no blocking was observed.

The powder paints were coated on a zinc phosphate treated panel using an electrostatic spray coater 720 type, and then baked in an oven at 200° C for 30 minutes to form a cured coating having a thickness of about 60 to 70 $\mu$.

The properties of the cured coatings are shown in Table 7.

TABLE 6

| Component | Example | | | | | | | |
|---|---|---|---|---|---|---|---|---|
| | 2 | 3 | 4 | 5 | 6 | 7 | 8 | 9 |
| Polyester | | | | | | | | |
| No. | B | B | C | D | E | G | H | I |
| Amount (g) | 887 | 890 | 881 | 804 | 884 | 924 | 244 | 291 |
| Polyoxirane compound | | | | | | | | |
| Polyoxirane compound | HBG | AG | TGI | BG | PBG | DGH | BG | HBG |
| Oxirane group content (g·eq/$10^6$ g) | 4082 | 6250 | 9520 | 5435 | 5952 | 4762 | 312 | 862 |
| Melting point (° C) | room temp., liquid | room temp., liquid | 105 | room temp., liquid | room temp., liquid | room temp., liquid | 147 | 90 |
| Amount (g) | 113 | 110 | 119 | 196 | 116 | 76 | 756 | 709 |
| O/C | 0.8 | 1.2 | 1.4 | 1.0 | 0.6 | 0.7 | 1.8 | 1.0 |
| Softening point (° C) | 73 | 68 | 72 | 65 | 78 | 82 | 135 | 84 |

Note
HBG: dodecahydrogenated bisphenol A diglycidyl ether
AG: diglycidyl adipate
TGI: triglycidyl isocyanurate
BG: bisphenol A diglycidyl ether
PBG: p-hydroxybenzoic acid diglycidyl ether ester
DGH: diglycidyl dimethyl hydantoin
O/C: the ratio of the oxirane group content of the polyoxirane compound to the carboxyl group content of the polyester

TABLE 7

| Test items | Example | | | | | | | |
|---|---|---|---|---|---|---|---|---|
| | 2 | 3 | 4 | 5 | 6 | 7 | 8 | 9 |
| Gloss | 100% | 103% | 96% | 101% | 100% | 97% | 101% | 104% |
| Impact strength test | ½"-500g-50cm | ½"-500g-50cm | ½"-500g-35cm | ½"-500g-50cm | ½"-500g-35cm | ½"-500g-40cm | ½"-500g-35cm | ½"-500g-50cm |
| Bending test | Good | Good | Good | Good | Good | Good | Good | Good |
| Erichsen test | >9mm | >9mm | >9mm | >9mm | >9mm | >9mm | >9mm | >9mm |
| Boiling water resistance test | No peeling | No peeling | No peeling | No peeling | No peeling | No peeling | No peeling | No peeling |
| Salt spray test | <1mm | 1mm | <1mm | <1mm | <1mm | <1mm | <1mm | <1mm |
| Acetone resistance test | Good | Good | Good | Good | Good | Good | Good | Good |
| Weatherability test | 90% | 95% | 93% | 82% | 96% | 94% | 76% | 86% |

TABLE 8

| | |
|---|---|
| Glycidyl methacrylate | 2.0 mols |
| Ethyl methacrylate | 0.9 mol |
| Butyl acrylate | 1.6 mols |
| Styrene | 3.8 mols |

To a monomeric mixture of the formulation shown in Table 8 were added 10 g of tert-butyl perbenzoate and 30 g of azobisbutyronitrile. The mixture was then added dropwise over the course of 4 hours to 1,000 ml of toluene heated at 100° C. The reaction was further continued for 10 hours at 100° C, and then the toluene was removed to provide an acrylic copolymer resin having a number average molecular weight of about 20,000 and an oxirane group content of 2,150 g·eq/$10^6$g and a softening point of 110° C. Powder paints were prepared in the same way as in Example 1 except that the polyester and the acrylic resin in the amounts shown in Table 9 were used instead of the polyester A and triglycidyl isocyanurate. The powder paints were coated, and baked at a temperature of 200° C for 30 minutes. The resulting coatings had a film thickness of 60 to 65μ and the properties shown in Table 10.

TABLE 9

| Component | Example 10 | Example 11 |
|---|---|---|
| Polyester | | |
| No. | F | J |
| Amount (g) | 786 | 606 |
| Acrylic resin | | |
| Amount (g) | 214 | 394 |
| O/C | 1.0 | 1.5 |
| Softening point (° C) | 102 | 96 |

Note: O/C represents the ratio of the oxirane group content of the acrylic resin to the carboxyl group content of the polyester.

TABLE 10

| Test items | Example 10 | Example 11 |
|---|---|---|
| Gloss | 100% | 100% |
| Impact strength test | ½″×500g×50cm | ½″×500g×45cm |
| Bending test | Good | Good |
| Erichsen test | > 9 mm | > 9 mm |
| Boiling water resistance test | No peeling | No peeling |
| Salt spray test | 1 mm | 2 mm |
| Acetone resistance test | Good | Good |
| Weatherability test | 94% | 93% |

EXAMPLES 12 TO 16

In the preparation of the heat-curable resin compositions in Examples 5 to 9, the curing accelerators shown in Table 11, 500 g of rutile-type titanium dioxide and 20 g of Silicone Oil YF-3860 were added to prepare powder paints.

Each of the powder paints was coated, and then baked at a temperature of 170° C for 20 minutes to form coatings having a film thickness of 60 to 65μ and the properties shown in Table 12.

TABLE II

| Component | Example 12 | Example 13 | Example 14 | Example 15 | Example 16 |
|---|---|---|---|---|---|
| Heat-curable resin composition (amount) | Example 5 (1,000g) | Example 6 (1,000g) | Example 7 (1,000g) | Example 8 (1,000g) | Example 9 (1,000g) |
| Curing accelerator | | | | | |
| Name | Magnesium stearate | Zinc stearate | Calcium palmitate | Barium laurate | Zinc caprylate |
| Amount (g) | 2 | 5 | 10 | 10 | 20 |

TABLE 12

| Test items | Example 12 | Example 13 | Example 14 | Example 15 | Example 16 |
|---|---|---|---|---|---|
| Gloss | 100% | 98% | 97% | 100% | 102% |
| Impact strength test | ½″-500g-50cm | ½″-500g-35cm | ½″-500g-50cm | ½″-500g-40cm | ½″-500g-50cm |
| Bending test | Good | Good | Good | Good | Good |
| Erichsen test | >9mm | >9mm | >9mm | >9mm | >9mm |
| Boiling water resistance test | No peeling | No peeling | No peeling | No peeling | No peeling |
| Salt spray test | <1mm | <1mm | <1mm | <1mm | <1mm |
| Acetone resistance test | Good | Good | Good | Good | Good |
| Weatherability | 80% | 95% | 93% | 76% | 84% |

TABLE 12-continued

| Test items | Example 12 | Example 13 | Example 14 | Example 15 | Example 16 |
|---|---|---|---|---|---|
| test | | | | | |

COMPARATIVE EXAMPLES 1 TO 5

The powder paints prepared in Examples 5 to 9 were coated, and baked at 170° C for 20 minutes to form coatings having the properties shown in Table 13.

TABLE 13

| Test items | Comparative Example 1 | 2 | 3 | 4 | 5 |
|---|---|---|---|---|---|
| Gloss | 102% | 100% | 101% | 103% | 105% |
| Impact resistance test | ½″- 500 g- 10 cm | ½″- 500 g- 10 cm | ½″- 500 g- 15 cm | ½″- 500 g- 10 cm | ½″- 500 g- 10 cm |
| Bending test | Poor | Poor | Poor | Poor | Poor |
| Erichsen test | <1mm | <1mm | 2mm | <1mm | 2mm |

While the invention has been described in detail and with reference to specific embodiments thereof, it will be apparent to one skilled in the art that various changes and modifications can be made therein without departing from the spirit and scope thereof.

What is claimed is:

1. A heat-curable resin composition having a softening point of about 40° to about 150° C for powder paint which is obtained by mixing (A) a polyester having an average degree of polymerization of about 3 to about 50, a softening point of about 40° C to about 150° C, and a carboxyl group content of 250 gram equivalents/$10^6$g to about 3,500 gram equivalents/$10^6$g, obtained by depolymerizing a polyester comprising an aromatic dicarboxylic acid and an aliphatic dialcohol and having a high degree of polymerization represented by an intrinsic viscosity, measured in a mixed solvent of phenol and tetrachloroethane in a 1:1 weight ratio at 20° C, of about 0.4 to about 2.0, using an aromatic or saturated aliphatic polycarboxylic acid having 2 to 4 carboxyl group or an alkyl ester thereof containing 2 to 12 carboxyl groups in the molecule at a temperature of about 180° C to about 300° C, with (B) a polyepoxide compound containing about 2 to about 100 epoxide groups per molecule and having an epoxide group content of about 300 gram equivalents/$10^6$g to about 9,600 gram equivalents/$10^6$g and a melting point of not more than about 150° C, in amounts which satisfy the following equation:

$$0.5 \leq O/C \leq 2.0$$

wherein O represents the epoxide group content of the polyepoxide compound, and C represents the carboxyl group content of the polyester.

2. The heat-curable resin composition of claim 1, wherein said polyester is a polyester having an average degree of polymerization of about 5 to about 50, a softening point of about 60° C to about 120° C and a carboxyl group content of about 300 gram equivalents/$10^6$g to about 2,500 gram equivalents/$10^6$g.

3. The heat-curable resin composition of claim 1, wherein said compound containing about 2 to about 12 carboxyl groups per molecule is a polyvalent carboxylic acid.

4. The heat-curable resin composition of claim 3, wherein said polyvalent carboxylic acid is terephthalic acid.

5. The heat-curable resin composition of claim 3, wherein said polyvalent carboxylic acid is isophthalic acid.

6. The heat-curable resin composition of claim 3, wherein said polyvalent carboxylic acid is adipic acid.

7. The heat-curable resin composition of claim 3, wherein said polyvalent carboxylic acid is sebacic acid.

8. The heat-curable resin composition of claim 3, wherein said polyvalent carboxylic acid is trimellitic acid.

9. The heat-curable resin composition of claim 3, wherein said polyvalent carboxylic acid is pyromellitic acid.

10. The heat-curable resin composition of claim 1, wherein said polyepoxide compound is bisphenol A diglycidyl ether type epoxy resin of the following structural formula:

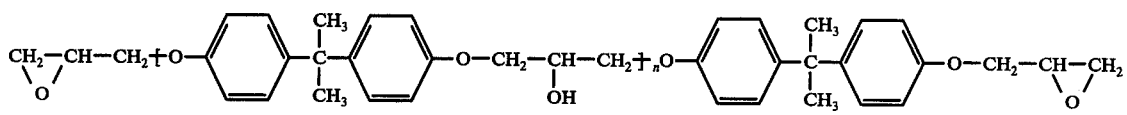

wherein n is about 0 to about 20.

11. The heat-curable resin composition of claim 1, wherein said polyepoxide compoound is a hydrogenated bisphenol A diglycidyl ether type epoxy resin of the following structural formula:

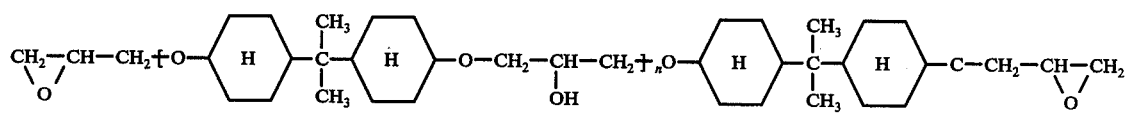

wherein n is about 0 to about 20.

12. The heat-curable resin composition of claim 1, wherein said polyepoxide compound is a p-hydroxybenzoic acid diglycidyl ether ester type epoxy resin of the following structural formula:

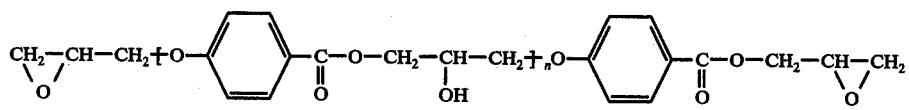

wherein n is about 0 to about 30.

13. The heat-curable resin composition of claim 1, wherein said polyepoxide compound is a triglycidyl isocyanurate type epoxy resin of the following structural formula:

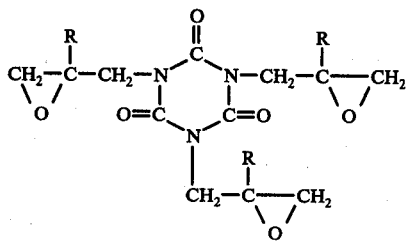

wherein R is a hydrogen atom or a methyl group.

14. The heat-curable resin composition of claim 1, wherein said polyepoxide compound is a diglycidyl hydantoin type epoxy resin of the following structural formula:

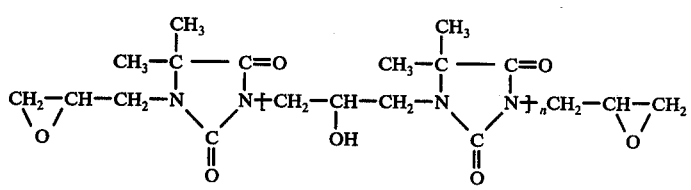

(n ÷ 0 - 30), and wherein n is about 0 to about 30.

15. The heat-curable resin composition of claim 1, wherein said polyepoxide compound is an acrylic resin containing about 2 to about 100 epoxide groups per molecule.

16. The heat-curable resin composition of claim 15, wherein said acrylic resin is a copolymer having a softening point of about 40° C to about 150° C and comprising about 5 to 40 mol% of a monomer of the following general formula:

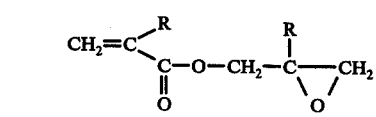

wherein R is a hydrogen atom or a methyl group, and an ethylenically unsaturated monomer copolymerizable therewith.

17. A heat-curable resin composition for powder paints comprising:

(1) 100 parts by weight of a heat-curable resin composition having a softening point of about 40° to about 150° C obtained by mixing (A) a polyester having an average degree of polymerization of about 3 to about 50, a softening point of about 40° C to about 150° C, and a carboxyl group content of about 250 gram equivalents/$10^6$g to about 3,500 gram equivalents/$10^6$g, obtained by depolymerizing a polyester comprising an aromatic dicarboxylic acid and an aliphatic dialcohol and having a high degree of polymerization represented by an intrinsic viscosity, measured in a mixed solvent of phenol and tetrachloroethane in a 1:1 weight ratio at 20° C, of about 0.4 to about 2.0, using an aromatic or saturated aliphatic polycarboxylic acid having 2 to 4 carboxyl groups or an alkyl ester thereof containing 2 to 12 carboxyl groups in the molecule at a temperature of about 180° C to about 300° C, with (B) a polyepoxide compound containing about 2 to about 100 epoxide groups per molecule and having an epoxide group content of about 300 gram equivalents/$10^6$g to about 9,600 gram equivalents/$10^6$g and a melting point of not more than about 150° C in amounts which satisfy the following equation:

$$0.5 \leq O/C \leq 2.0$$

wherein O represents the epoxide group content of the polyepoxide compound, and C represents the carboxyl group content of the polyester, and (2) about 0.1 to about 5 parts by weight of a salt formed between an aliphatic monocarboxylic acid containing 2 to 20 carbon atoms and an element of Group II of the Periodic Table.

18. The heat-curable resin composition of claim 17, wherein said aliphatic monocarboxylic acid is stearic acid.

19. The heat-curable resin composition of claim 17, wherein said element of Group II of the Periodic Table is magnesium.

20. The heat-curable resin composition of claim 17, wherein said element of Group II of the Periodic Table is calcium.

21. The heat-curable resin composition of claim 17, wherein said element of Group II of the Periodic Table is zinc.

22. The heat-curable resin composition of claim 17, wherein said element of Group II of the Periodic Table is barium.

* * * * *